United States Patent [19]

Ina

[11] 4,174,900
[45] Nov. 20, 1979

[54] CAMERA TRIPOD

[75] Inventor: Tatsuo Ina, Tokyo, Japan

[73] Assignee: Mitsuwa Shashin Kogyo Kabushiki Kaisha, Tokyo, Japan

[21] Appl. No.: 892,138

[22] Filed: Mar. 31, 1978

[30] Foreign Application Priority Data

Jun. 29, 1977 [JP] Japan .............................. 52/85732[U]
Jun. 29, 1977 [JP] Japan .............................. 52/85733[U]

[51] Int. Cl.² .................. G03B 17/00; F16B 7/10; F16B 7/14; F16M 11/26
[52] U.S. Cl. ................................ 354/293; 248/188.5; 248/337; 403/109
[58] Field of Search ................. 354/81, 293; 352/243; 248/163, 168, 173, 435, 188.2, 188.5, 337; 403/109

[56] References Cited
U.S. PATENT DOCUMENTS

| 3,589,757 | 6/1971 | Mooney | 248/188.5 X |
| 4,029,279 | 6/1976 | Nakatani | 248/188.5 |
| 4,080,080 | 3/1978 | Cisler | 248/188.5 |

FOREIGN PATENT DOCUMENTS

| 1138238 | 10/1962 | Fed. Rep. of Germany | 248/188.5 |
| 2647664 | 12/1977 | Fed. Rep. of Germany | 403/109 |
| 2632526 | 1/1978 | Fed. Rep. of Germany | 403/109 |
| 2640610 | 3/1978 | Fed. Rep. of Germany | 403/109 |

Primary Examiner—Donald A. Griffin
Assistant Examiner—Thomas H. Tarcza
Attorney, Agent, or Firm—Cushman, Darby & Cushman

[57] ABSTRACT

A tripod for a camera having legs with telescoping portions, each of which is U-shaped in cross-section; snap levers are mounted on the interior of the legs to hold the legs in a fixed extended position and to permit the legs to be collapsed without interfering in the telescoping action so that the inner leg portions can be fully retracted.

5 Claims, 14 Drawing Figures

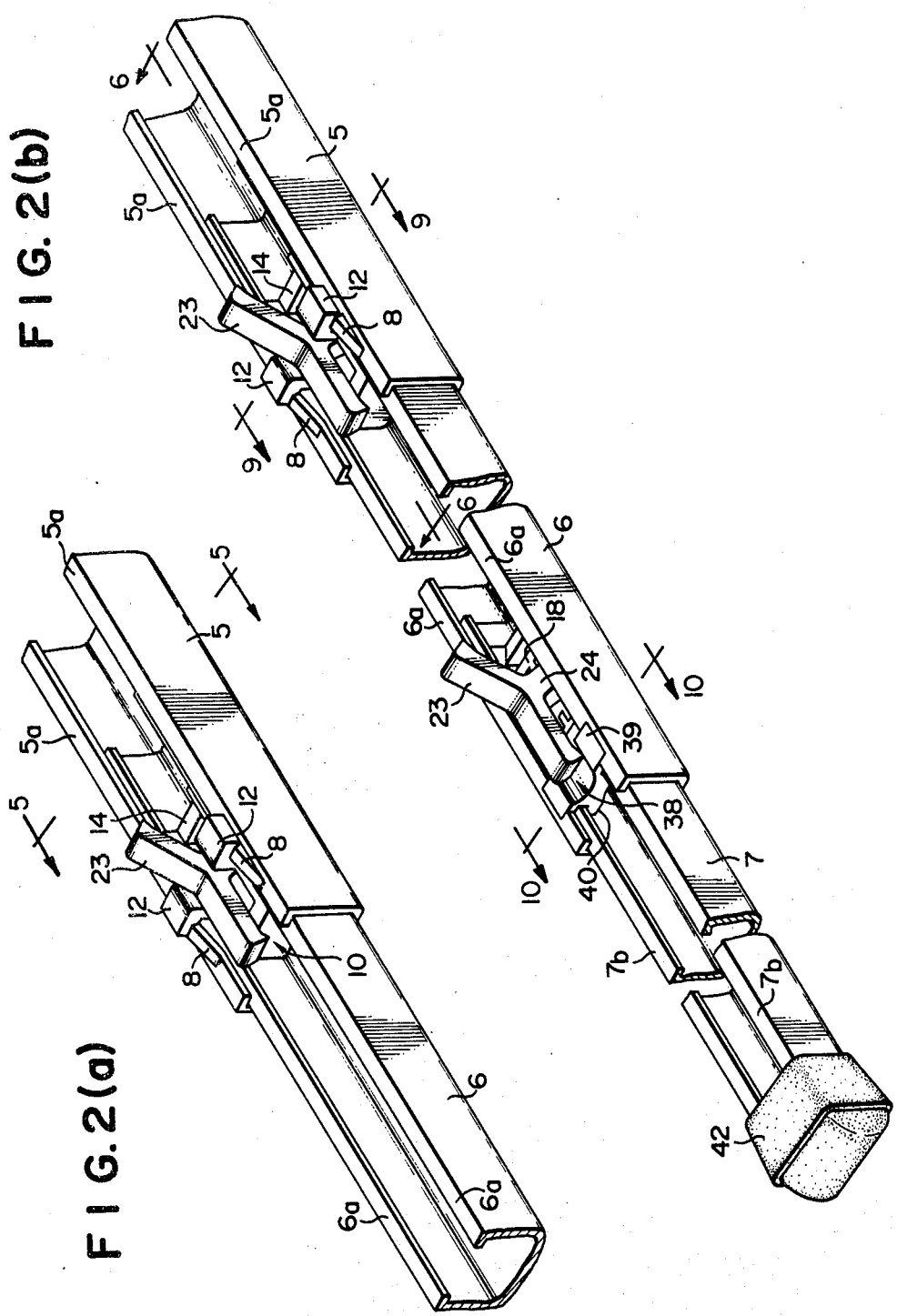

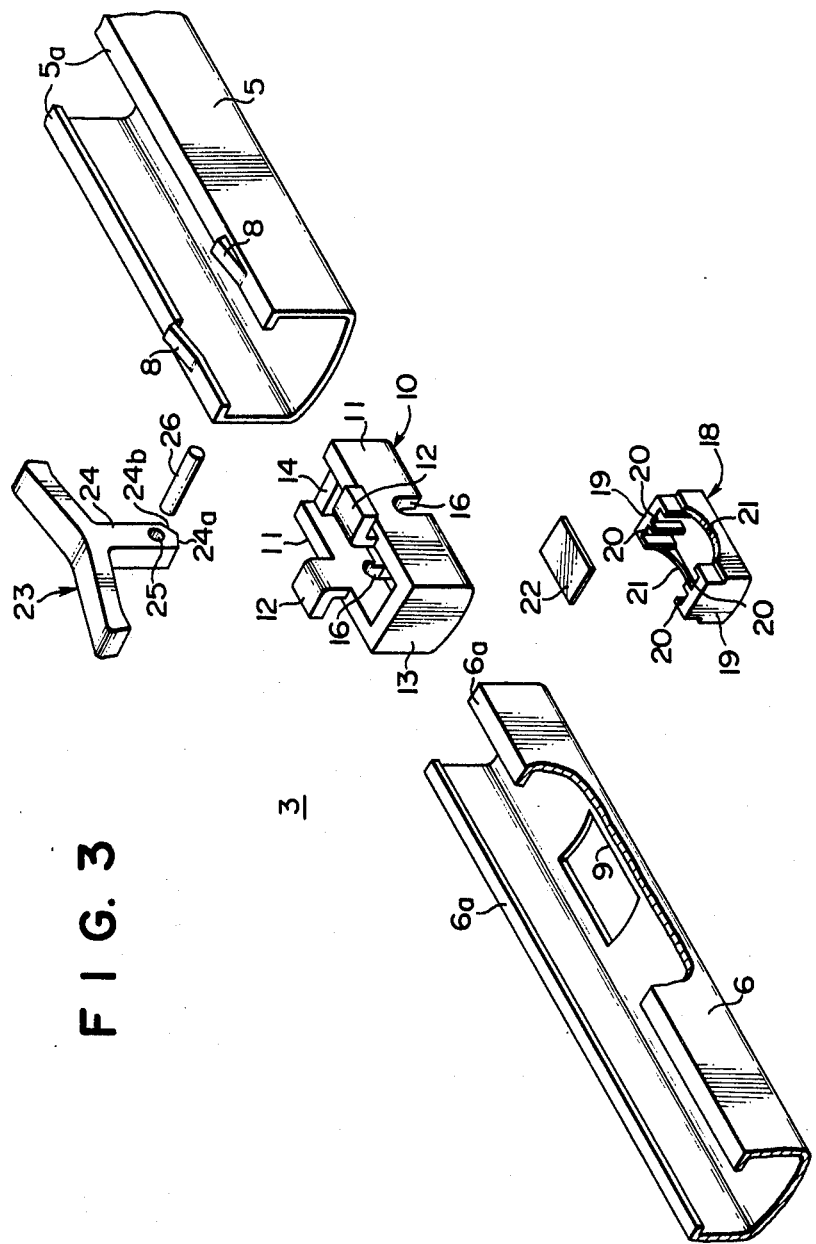

CAMERA TRIPOD

BACKGROUND OF THE INVENTION

The present invention relates to an improvement in tripods for photographic cameras.

In conventional tripods for cameras, a base plate is provided to which the camera is attached and two or three metallic pipes or tubes each having a smaller diameter are telescopically arranged or disposed within one another to permit the height of the tripod to be adjusted. The fixing of the telescoping leg segments in a desired position is conventionally done with collars located on the end of each of the inner leg postions so that upon rotation of a collar in one direction, the inter-fitting tubular leg is squeezed and held in position. However, the rotary motion is time-consuming and renders difficult the accurate adjustment of the legs.

To overcome this disadvantage, a tripod having a leg clamping element such as a snap lever has been suggested but this arrangement requires another element for fixing the snap lever in position. As a result, the element increased the overall size of the leg grasping mechanism which rendered the tripod inconvenient to transport easily as the overall collapsed size of the tripod was undesirably increased.

SUMMARY OF THE INVENTION

To overcome the foregoing drawback in the conventional tripod, the present invention provides a tripod wherein the snap levers are located inside of U-shaped legs and are constructed so as to reduce the amount of force required to actuate the snap levers while decreasing the size of the collapsed length of the tripod. As a result, the overall compactness of the resulting tripod is improved.

The foregoing and other advantages will become apparent as consideration is given to the following detailed description taken in conjunction with the accompanying drawings, in which:

BRIEF DESCRIPTION OF THE DRAWINGS

FIGS. 2a and 2b are enlarged detailed views of a first and second embodiment of the present invention;

FIG. 3 is an exploded view with parts broken away of one embodiment of the present invention;

DETAILED DESCRIPTION OF THE INVENTION

Figure 1:
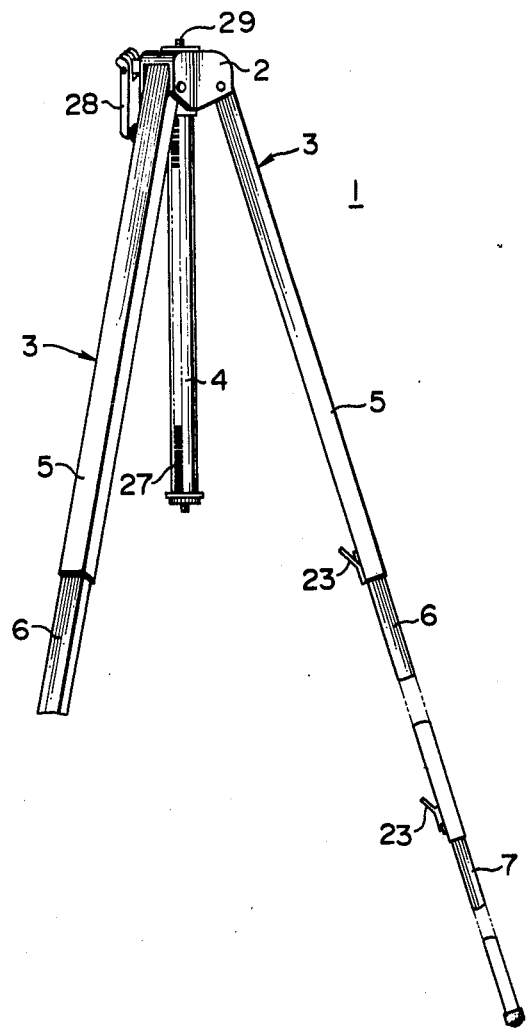
FIG. 1 is an elevational view of the tripod of the present invention.

Referring to FIG. 1, there is shown a camera tripod comprising a head 2, three legs 3 and an elevator member 4.

The legs 3 are identical in construction and are shown more clearly in the enlarged view of FIGS. 2a and b and the exploded view of FIG. 3. More specifically, each leg 3 comprises a first leg portion 5 which may be made from an aluminum alloy and has a generally U-shaped cross section. The second and third leg portions 6 and 7 are similarly shaped but have gradually reduced cross-sectional areas so as to telescopically interfit with each other and the first leg portion 5. Provided at the lower end of the first leg portion 5 are a pair of stop members 8 which are formed by protruding bent portions from the in turned flanges 5a and 6a on leg portions 5 and 6. At the upper ends of the second and third leg portions 6 and 7, there are provided openings 9 which are square in shape as best seen in FIG. 3 and which are cut in the base wall of the leg portions.

Figure 4:
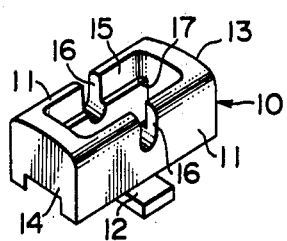
FIG. 4 is an enlarged detailed view of the clamping element carrier.
Figure 5:
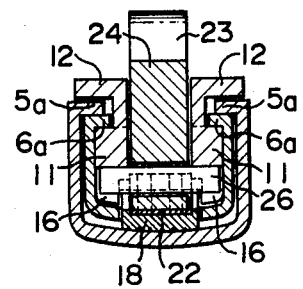
FIG. 5 is a sectional view taken along lines 5—5 in FIG. 2.

As a support for the snap lever, to be described below, there is provided a carrier frame 10 which may be made of a synthetic resin and which is generally cubic in shape but hollow. As shown in FIG. 3, the carrier frame 10 has engaging members 12 protruding outwardly therefrom in an L-shaped configuration at approximately the center of the side walls 11. The end walls 13 and 14 of the carrier frame 10 are flat and give rigidity to the frame member 10. The end wall 14 is recessed relative to the side walls 11. As shown in FIG. 4, carrier frame 10 has a square shaped opening 15 along its bottom surface and two notches 16 are provided in each of the side walls 11 which extend to approximately half of the height of the walls 11. Along the inside surfaces of the walls 11, there are provided shoulders, one of which is shown at 17 in FIG. 4.

When assembled, fitted within the opening 15 is a press member 18 which is generally rectangular in shape and which also may be made from a synthetic resin material or the like. The bottom of the press member 18 is slightly concave along one side and convex on the other to improve the frictional gripping action. On the interior of the side walls 19 of the press member 18 are provided two slots 20 which extend perpendicular to the base of the member 18. These slots are provided for receiving the ends of a pin which can be substituted for a support plate in another embodiment of the present invention. The long sides 21 of the press member 18 are arcuately cut to form recesses therein.

A seat plate 22 occupies the interior of the press member 18. The seat plate 22 may be made from steel and should be square in shape. The thickness of the seat plate 22 may be varied, as will be seen, to vary the amount of force required to effect the locking of the snap lever in place.

The snap lever 23 is utilized to effect a clamping and releasing between the first leg portion 5 and the second leg portion 6. The snap lever 23 may be made from a synthetic resin material or the like and is generally T-shaped. A bore 25 is drilled through the lower end of the base leg 24 through which a pin 26 is inserted, the ends of which fit in the notches 16 of the carrier frame 10. The lower end of the snap lever 23 in which the bore is formed is wedge shaped having a low gradient sloping surface and a steep surface, 24a and 24b, respectively. With this arrangement, the distance from the center of the pin 26 to the surfaces 24a and b are different from each other, but the distance from the bore to the surface 24a should be greater than the distance from the bore to the surface 24b. Also, preferably, the ridge line where surfaces 24a and b intersect should lie on the end of leg 24 over the line which bisects leg 24 along its length. Thus, surface 24b will be longer in length and surface area than surface 24a.

Figure 6:
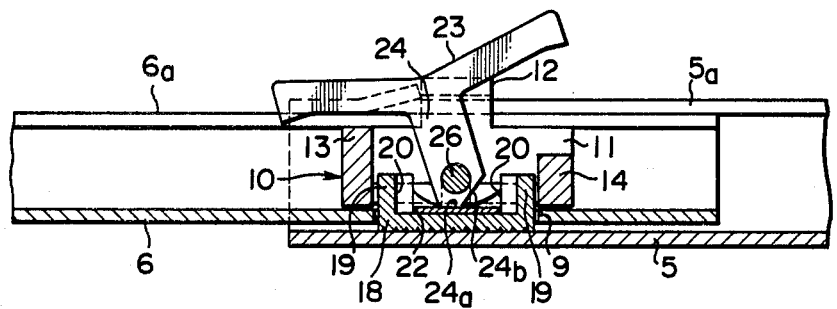
FIGS. 6 and 7 are sectional views taken along lines 6—6 in FIG. 2 but showing the snap lever in two operating positions.

In assembling the tripod as thus far described, the second leg portion 6 is inserted into the first leg portion 5 and the opening 9 of the second leg 6 is positioned at an upper end of the first leg 5, that is exposed or beyond the upper end of leg portion 5. At this stage, a carrier frame 10 is inserted into the second leg portion 6 and its opening 15 is engaged with the opening 9 of the second leg portion 6. A press member 18 is then inserted into the opening 9 and up through the opening 15 of the carrier frame 10. This insertion is carried out until the press member 18 abuts against the shoulders 17 in the carrier frame 10. Then, the second leg is withdrawn into the first leg until the portions 12 rest on the in turned flanges 5A of the first leg portion 5 and the upper edges of the side walls 11 of carrier frame 10 abut with the underside of the flange portions 6A of the second leg portion 6. With this arrangement as shown in FIG. 6, when the leg portions 5 and 6 are relatively telescoped, the turned in flanges 6A will ride in engagement with the in turned flanges 5A. Next, the press member 18 is positioned within the side walls of the first leg portion 5. Then, the snap lever 23 should be rotated so as to exert the least force on the press member 18, as discussed below.

As thus far described, the carrier frame 10 is held at the position of the opening 9 of the second leg portion 6 until the assembly procedures described above are followed in reverse order. Also, it should be noted that the protruding members 12 of the carrier frame 10 will engage the stop members 8 to limit the extension of the second leg portion 6 out of the interior of the first leg portion 5.

It will be understood that while the above description relates to the assembly of the snap lever means between the first and second leg portions 5 and 6, the same procedures are employed for the assembly of the second and third leg portions 6 and 7.

Figure 7:
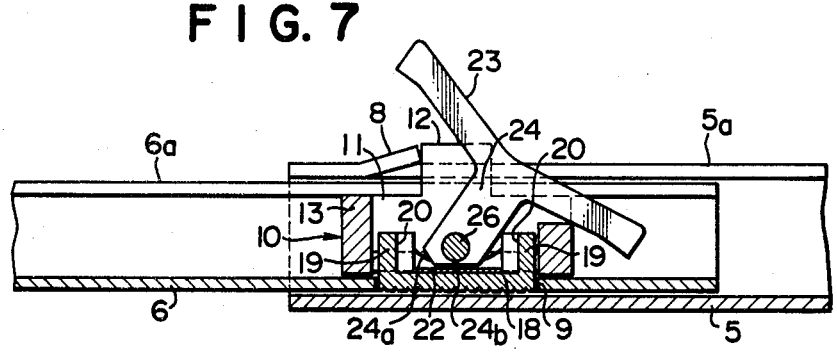
Figure 8:
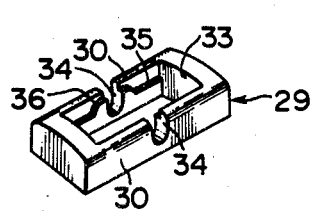
FIG. 8 is a detailed view of the clamping element carrier member used in a smaller cross-sectional area leg portion.
Figure 9:
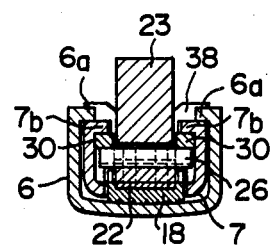
FIG. 9 is a sectional view taken along lines 9—9 of FIG. 2b.

With the devices thus far described, when the snap lever 23 is rotated in a counterclockwise direction, as viewed in FIG. 6, about pin 26, the surface 24A of the leg 24 will press the press member 18 acting through the seat plate 22, as shown in FIG. 6, to thereby strongly engage the member 18 with the inner surface of the base portion of the first leg portion 5 to effect locking engagement therewith. When the snap lever 23 is rotated in a clockwise direction as viewed in FIG. 7, to a point where it engages the reduced height side wall 14 of the carrier frame 10, the low gradient surface 24B of the leg 24 will contact the seat plate 22 to thereby release the press member 18 and unlock the two leg portions. The second leg portion 6 will then be freely slidable with respect to the first leg portion 5 and can be fixed in any position along the length of the first leg portion 5 inside of the stop members 8.

The elevator comprises a cylindrical metal tube 4 which has along its side a rack gear 27 mated with a pinion gear (not shown) contained within the end 2. Rotation of a handle 28 will cause the elevator 4 to ascend and descend freely to adjust the position of the camera with respect to the top of the tripod where a camera can be fixed on a thread axis 29.

In order to reduce the manufacturing cost of a tripod of the present invention, the leg portions 5, 6 and 7 may be formed from drawn aluminum on a bench machine and the elements of the snap lever may be made from a synthetic resin without requiring precision in production. Where inaccuracies exist in the manufacture of the elements, in assembling the tripod, compensation is inexpensively provided by inserting a plurality of seat plates 22 of differing thickness so as to assure firm locking action.

Also, it should be noted that, when assembled, the snap lever mechanisms are located on the interior of the tripod structure so that possibility of accidentally unlocking the snap levers is minimized.

While the snap lever mechanism as discussed above with respect to leg portions 5 and 6 may also be employed between legs 6 and 7, such an arrangement has a disadvantage that the leg portions 6 and 7 cannot be completely telescoped within the large cross-sectional area leg portions 5. Another embodiment of the present invention overcomes this difficulty, as described below.

Referring to FIGS. 8 through 12, a carrier frame 29 is of reduced size to permit it to be inserted within the leg portion 7. The frame 29 has left and right sides 30 and end walls 31 and 32 with the end wall 32 being of reduced height relative to the height of end wall 30. On the side walls 30, at approximately the mid-point thereof, there are provided notches 34 which extend from the bottom of the frame 29 to about half the height of the side walls 30. As in the previous frame 10, shoulders 35 are formed on the inside of the side walls 30 as shown more clearly in FIG. 8 at 35. However, adjacent the notches 34, raised, arcuate portions 36 are provided. The upper ends of the side walls 21 of the press member 18 engage the shoulders 35 and the raised arcuate portions 36.

On the lower end remote from the opening 9 on leg portion 6, the inwardly bent flanges 6A are provided with notches 37 which are square in form and opposite one another. In the upper end of leg portion 7, an opening 7A is provided in the base thereof similar to the opening 9 in the upper end of leg portion 6 through which press member 18 is inserted.

Figure 10:
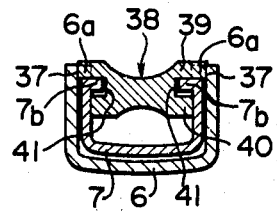
FIG. 10 is a sectional view taken along lines 10—10 in FIG. 2b.
Figure 11:
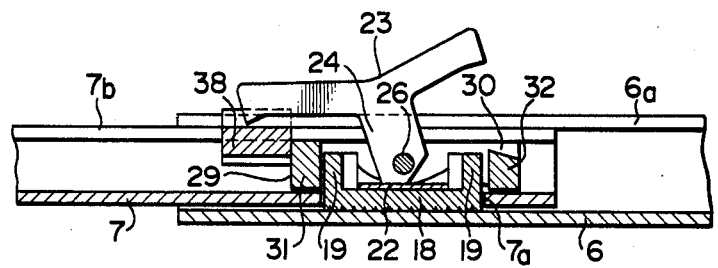
FIG. 11 is a sectional view showing the clamping element in engagement for the embodiment of FIG. 2b.

A stopper 38 is provided which is H-shaped in cross section as shown in FIG. 10. Two tongues 39 extend outwardly from the center of the stopper 38 to interfit with the notches 37 in the flanges 6A. Spaced from the tongues 39 are a similarly shaped pair of tongues 40 with a groove between the tongues 39 and 40 of a width to interfit with the in turned flanges 7B of leg portion 7. At the lower extremity of leg portion 7, a slide block 42 is secured which serves as a foot of the tripod leg.

To assemble leg portions 6 and 7, the third leg portion 7 is telescoped within the second leg portion 6 so that the opening 7A protrudes from the upper end of the leg portion 6 remote from the notches 37. The carrier frame 29 is inserted into the leg portion 7 with the snap lever 23 attached. With the opening 33 of the carrier frame 29 abutted within the 7A, the press member 18 is inserted with its seat plate 22. Then, leg portion 7 is pulled down through leg portion 6, telescopically. Before the leg portion 7 is pulled past the notches 37, in leg portion 6, the stopper 38 is inserted and then the in turn flanges 7B of leg portion 7 are engaged in slots 41 of the stopper 38.

The tongues 39 will, of course, remain flush with the surfaces 6A of leg portion 6 to ensure the smooth telescoping movement between these elements and the full retraction of leg portion 6 within leg portion 5 and leg portion 7 within leg portion 6 up to the foot member 42.

Figure 13:
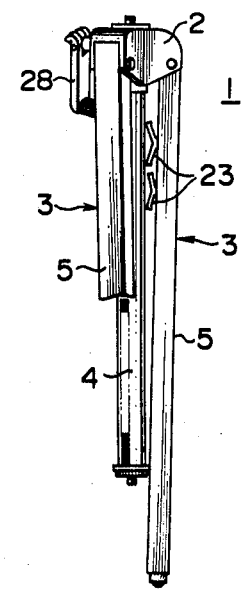
FIG. 13 is a front view with parts broken away showing the tripod of the present invention in a fully collapsed position.
Figure 12:
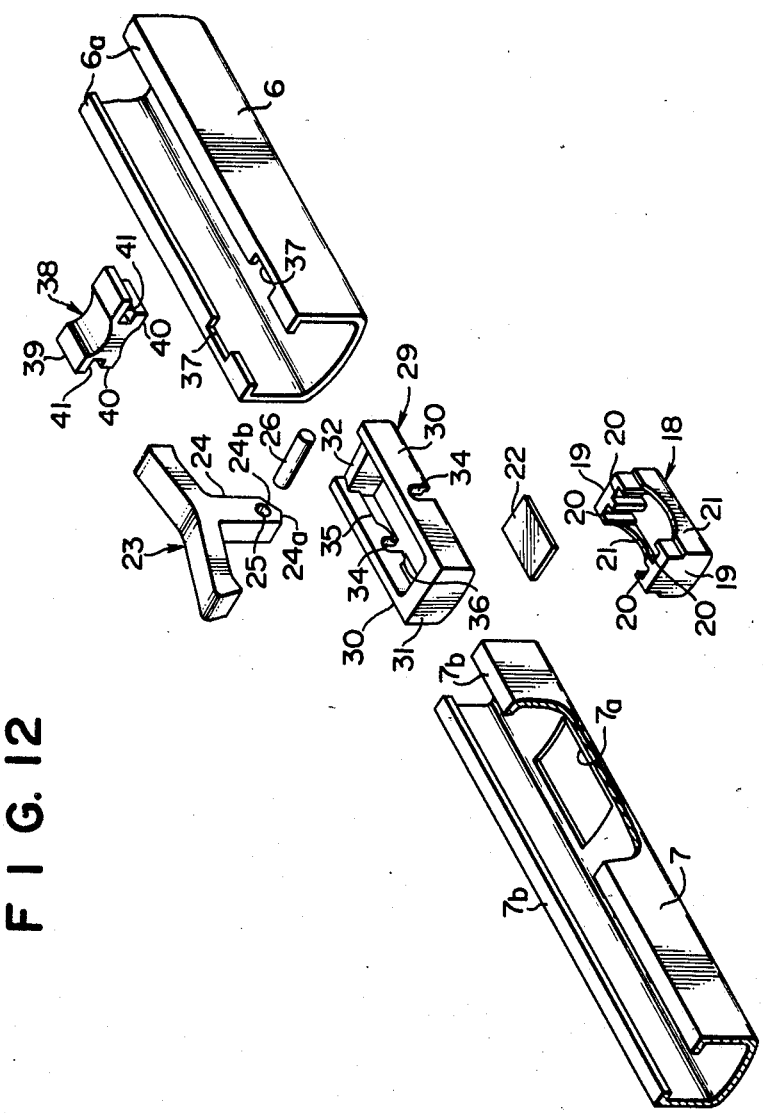
FIG. 12 is an exploded view of the snap lever clamping arrangement for the outermost leg portion of the tripod.

From the foregoing description, it will be apparent that the tripod of the present invention will permit rapid and easy setting up and collapsing of the tripod to as compact a condition as possible. Further, by locating the snap levers on the interior of the legs of the tripod, accidental disengagement of the snap levers is rendered less likely. Further, as shown in FIG. 13, with the legs 3 collapsed, accidental elongation of the separate leg portions is prevented since the snap levers will be maintained in their locked positions by engagement with the tube 4 of the elevator.

Having described the invention, it will be apparent that various modifications may be made therein without departing from the spirit and scope of this invention as defined in the appended claims.

What is claimed is:

1. A support apparatus comprising a plurality of legs, each leg comprising at least a first and a second leg element with said second leg element telescopically inserted in and movable relative to said first leg element, each leg element being substantially U-shaped in cross section and having a base wall and generally perpendicularly extending side walls, carrier frame means disposed on the interior of said second leg element, said carrier frame means having a hollow interior, a base and side walls extending from said base, said base having an opening therein, a press member carried by said carrier frame means and extending into said opening in said base and being movable at least partially through said opening in said base of said carrier frame means, said base wall of said second leg element having an opening therein, said carrier frame means being disposed over said opening in said base wall of said second leg element, lever means pivotally mounted on the interior of said carrier frame means and engaging said press member to move said press member through said opening in said base wall of said second leg element and press against said base wall of said first leg element when said lever means is pivoted from a deactuated to an actuated position.

2. The apparatus as claimed in claim 1 wherein said first leg element has one end connected to support plate means and an opposite end, stop means being disposed on said first leg element adjacent said opposite end, said carrier frame means having abutment means engageable with said stop means to prevent withdrawal of said second leg element from said first leg element.

3. The apparatus as claimed in claims 1 or 2, wherein said press member includes a seat plate member which is engaged by said lever means.

4. The apparatus as claimed in claim 1 wherein three legs are provided, each leg comprising a said first, a said second and a third leg element which is telescopically inserted in and movable relative to a said second leg element, said third leg element being substantially U-shaped in cross section and having a base wall and generally perpendicularly extending side walls, another carrier frame means disposed within said third leg element, said another carrier frame means having a hollow interior, a base portion and side walls extending from said base portion, said base portion having an opening therein, a press member carried by said another carrier frame means and extending into said opening in said base portion and being movable at least partially through said base portion's opening, said base wall of said third leg element having an opening therein, said another carrier frame means being disposed over said opening in said base wall of said third leg element, another lever means pivotally mounted on said another carrier frame means and engaging said press member carried thereby to move said press member through said opening in said base wall of said third leg element and to press said press member or said another carrier frame means against said base wall of said second leg element when said another lever means is pivoted from a deactuated to an actuated position, said second leg having one end inserted in said first leg and, adjacent its other end, a pair of opposed notches formed in the end of said side walls thereof, a stopper member having tongue portions inserted in said notches, said stopper member being of a size to block movement of said another carrier frame means thereby.

5. The apparatus as claimed in claim 3 wherein said lever means is a T-shaped member with a central leg, said central leg having an end engaged with said seat plate, said end having a first flat surface for engaging said seat plate when said lever means is in said deactuated position and a second flat surface extending at an angle to said first flat surface for engaging said seat plate when said lever means is in said actuated position, a bore through said central leg adjacent said end and a pivot pin extending through said bore, said pivot pin being mounted in said carrier frame means.

* * * * *